United States Patent
Wang et al.

(10) Patent No.: US 8,924,943 B2
(45) Date of Patent: Dec. 30, 2014

(54) BROWSER EMULATOR SYSTEM

(75) Inventors: Pei Wang, Saratoga, CA (US); Yitao Yao, Saratoga, CA (US); Mark P. Palaima, Saratoga, CA (US); Homayoun Zariv, Danville, CA (US); Rajasekhar Bhogi, San Jose, CA (US)

(73) Assignee: eBay Inc., San Jose, CA (US)

( * ) Notice: Subject to any disclaimer, the term of this patent is extended or adjusted under 35 U.S.C. 154(b) by 1411 days.

(21) Appl. No.: 12/505,411

(22) Filed: Jul. 17, 2009

(65) Prior Publication Data

US 2011/0015917 A1 Jan. 20, 2011

(51) Int. Cl.
*G06F 9/44* (2006.01)
*G06F 9/455* (2006.01)
(52) U.S. Cl.
CPC .. *G06F 9/455* (2013.01); *G06F 8/35* (2013.01)
USPC .......................................................... 717/134
(58) Field of Classification Search
CPC ................................... G06F 9/455; G06F 8/35
USPC .......................................................... 717/134
See application file for complete search history.

(56) References Cited

U.S. PATENT DOCUMENTS

2003/0088639 A1* 5/2003 Lentini et al. ................. 709/217
2008/0201453 A1* 8/2008 Assenmacher ............... 709/219

* cited by examiner

*Primary Examiner* — Wei Zhen
*Assistant Examiner* — Lanny Ung
(74) *Attorney, Agent, or Firm* — Schwegman, Lundberg & Woessner, P.A.

(57) ABSTRACT

A browser emulator is provided. An example browser emulator system includes a communications module to receive requests for web pages from a browser application, a document object model (DOM) interceptor to intercept an initial document object model (DOM) provided by the web application, an activator to activate a browser emulator, and a DOM manipulator to generate a modified DOM. A marked-up document that corresponds to the modified DOM includes an event interceptor that replaces JavaScript code associated with the original DOM provided by the web application.

20 Claims, 6 Drawing Sheets

BROWSER EMULATOR SYSTEM

TECHNICAL FIELD

This application relates to the technical fields of software and/or hardware technology and, in one example embodiment, to a browser emulator system.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

JavaScript is a scripting language that is used for client-side web development to add interactivity to HTML pages. Despite its name, and while designed to look like Java™, JavaScript™ is unrelated to the Java™ programming language. Rather, JavaScript™ is a dynamic, weakly typed, prototype-based language intended to be easier for non-programmers as a tool with which to work. "JavaScript®" and "Java®" are registered trademarks of Sun Microsystems, Inc. of Santa Clara, Calif.

JavaScript may be thought of as a scripting add-on to HTML, where JavaScript code is added to HTML commands by use of the <SCRIPT> tag. JavaScript is an interpreted language, which means that scripts (JavaScript code) is executed without preliminary compilation. JavaScript code is executed in the client browser. JavaScript code is first parsed, and then it is executed if it is determined during the parsing that the JavaScript contains no errors, then the code is executed by the browser. For a while now, JavaScript™ has been a de facto client-side scripting language for web pages.

BRIEF DESCRIPTION OF DRAWINGS

Embodiments of the present invention are illustrated by way of example and not limitation in the FIGs. of the accompanying drawings, in which like reference numbers indicate similar elements and in which.

DETAILED DESCRIPTION

Figure 1:
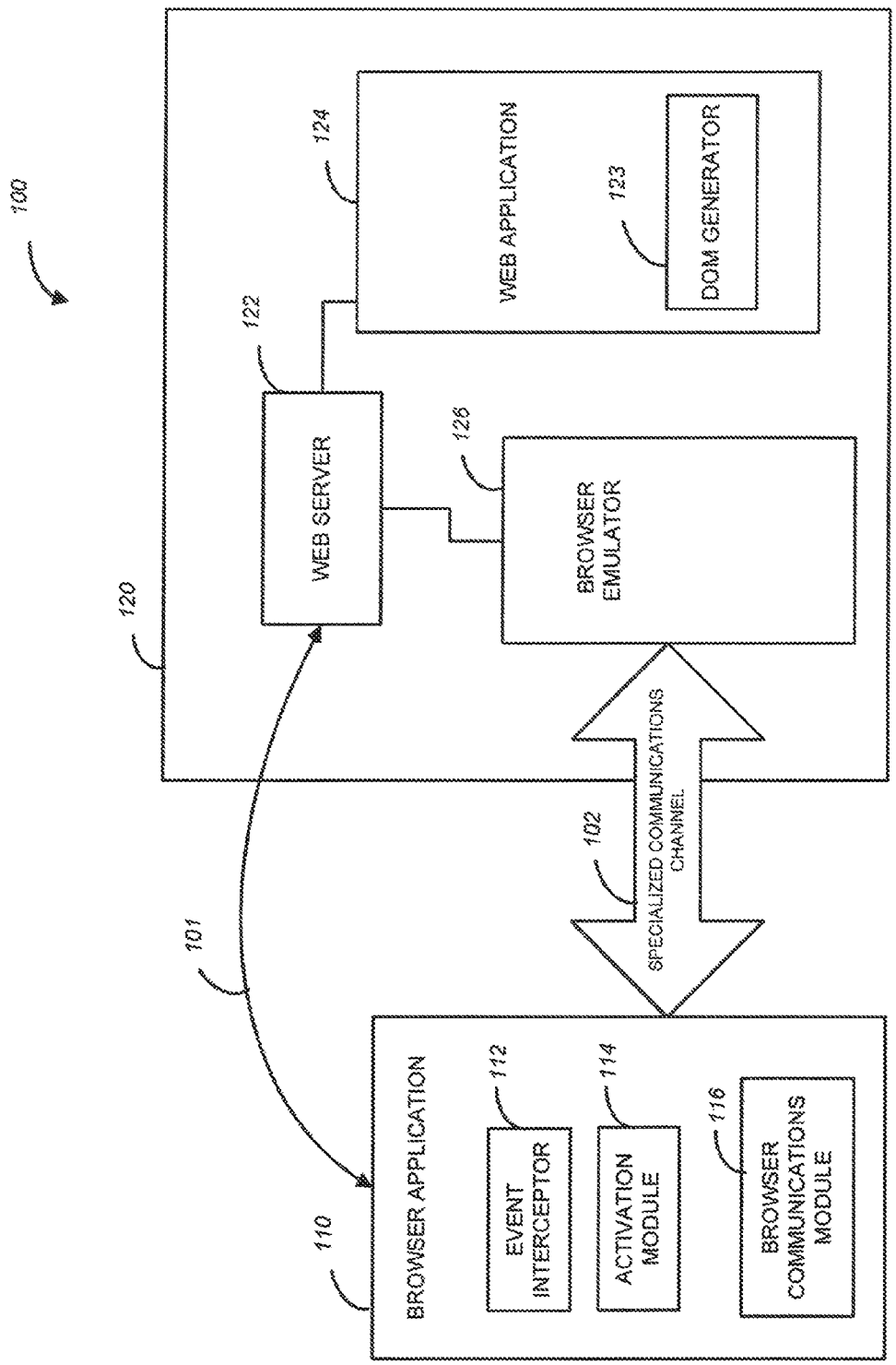
FIG. 1 is a diagrammatic representation of an architecture within which an example browser emulator system may be implemented.

In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, although various exemplary embodiments discussed below focus on administration of Java-based servers and related environments, the embodiments are given merely for clarity in disclosure. Thus, any type of server environment, including various system architectures, may employ various embodiments of the application-centric resources system and method described herein and is considered as being within a scope of the present invention.

A Document Object Model (DOM) is an application programming interface (API) that defines logical structure of documents (e.g., HTML documents and well-formed XML documents) and the way a document is accessed and manipulated. The DOM may be used to manage data presented as a document. For example, various elements found in an HTML or XML document can be accessed, changed, deleted, or added using the Document Object Model. The purpose of a browser application (also referred to as a web browser or merely browser) is to display resources to users. A browser application transmits requests content to a web server, which, in turn, obtains the requested content (e.g., an HTML document that includes JavaScript code). At the browser application, the HTML document is transformed from markup to an interactive document. Aside from HTML documents, web browsers can display other types of content that can be part of a web page, such as images, audio, video, and XML files. A browser renders HTML statements and executes JavaScript code if JavaScript code is embedded or referenced in the HTML document. For the purposes of this description, content that can be rendered by a browser or by any rendering engine configured to display marked up content (e.g., HTML, XML, etc.) is referred to as a web page.

A method and system is described to process marked-up content in a manner that relocates the execution of JavaScript to Java environment. In one example embodiment, a request for content is typically received by a web server that is responsible for accepting HTTP requests from clients (user agents such as web browsers), and serving them HTTP responses along with optional data contents, which usually are web pages such as HTML documents and linked objects (images, etc.). In one example embodiment, a web server includes an event interceptor module that intercepts a DOM received from a web application, extracts JavaScript, and replaces it with a communications client that establishes a communications channel with a so-called browser emulator instantiated on the server. For the purposes of this specification, in order to differentiate a browser application that is typically used for retrieving and presenting content on the World Wide Web from a browser emulator running in Java environment, a typical browser application will be referred to as a browser application or simply a browser. A browser emulator, in one example embodiment, may be implemented as a runtime module in Java environment that can execute JavaScript instructions. An example browser emulator may be configured such that it does not have rendering capability. Instead, a browser emulator may communicate with a rendering engine (e.g., a browser application) via a specialized communications channel such that the results of the JavaScript code execution performed at the browser emulator are reflected by the browser application.

The specialized communications channel, in one embodiment, is established between a browser bridge module provided with the browser emulator and an event interceptor module provided to the browser application by including the event interceptor with the requested web page. When the browser application encounters the event interceptor embedded in the web page, the event interceptor issues a request to the browser emulator via the specialized communications channel. The browser emulator receives the request and commences executing the JavaScript that was extracted by the web server. The browser emulator communicates every result of JavaScript execution to the browser application such that the browser reflects the execution of JavaScript as if the execution is taking place in the browser application.

An approach where a JavaScript can be executed in Java environment may be utilized beneficially, e.g., for debugging purposes. A browser emulator may be configured to communicate with a debugging module provided with the integrated development environment (IDE) to permit debugging of JavaScript code in Java environment. In some embodiments, a browser emulator may be utilized to make available functionality provided by JavaScript scripts outside of a browser application and also to enable execution and debugging of JavaScript in its authored form (whether it is Java or JavaScript).

FIG. 1 is a diagrammatic representation of an architecture 100 within which an example browser emulator system may be implemented. As shown in FIG. 1, the architecture 100 may include a browser application 110 in communication with a system for providing web pages referred to as a server system 120. The browser application 110 may be provided, e.g., on a stand-alone client computer system (not explicitly shown) or it can be provided on the same computer system and the same hardware as the server system 120. The server system 120, in one example embodiment, may communicate with the browser application 110 via a transfer protocol link 101 and a specialized communications channel 102. A transfer protocol used by the transfer protocol link 101 may be, e.g., Hypertext Transfer Protocol (HTTP), Hypertext Transfer Protocol Secure (HTTPs), or file transfer protocol (FTP). The transfer protocol link 101 and the specialized communications channel 102 may be used via a network, such as a public network (e.g., the Internet, a wireless network, etc.) or a private network (e.g., a local area network (LAN), a wide area network (WAN), Intranet, etc.).

As shown in FIG. 1, the server system 120 comprises, in one example embodiment, a web server 122 that receives and processes requests from the browser application 110 and a web application 124. The web server 122 receives a request for a web page from the browser application 110 and obtains, from the web application 124, a DOM that corresponds to the requested web page. The web application 124 generates the DOM utilizing a DOM generator 123. While FIG. 1 shows the web server 122 to receive and process requests from the browser application 110, a servlet may be used for this purpose instead.

In one example embodiment, the web server 122 is configured to intercept the DOM provided by the web application 124 and activate a browser emulator 126 in response to receiving the DOM. The browser emulator 126 modifies the DOM by replacing JavaScript code present in the DOM with an event interceptor. The event interceptor 112, which may be implemented in JavaScript, is loaded in the browser application 110. The event interceptor 112, in one embodiment, is configured to send events and corresponding DOM changes to the browser emulator 126. A web page that results from a DOM where JavaScript code is replaced by the event interceptor 112 causes the associated JavaScript code to be executed not in the browser application 110, but by the browser emulator 126. The event interceptor 112 may be implemented in Flash® and may be configured to communicate with the browser emulator 126 via the specialized communications channel 102 (e.g., Duplex communication channel implemented in Flash® and JavaScript on the client side) while a web page associated with the DOM is being rendered by the browser application 110. As shown in FIG. 1, the browser application 110 includes an activation module 114. The activation module 114 may be implemented as a client side library and may be configured to establish connection between the browser application 110 and the browser emulator 126, as well as to facilitate installation of the event interceptor 112.

As mentioned above, the browser emulator 126 does not have a rendering ability but is configured to propagate any results of the execution of the JavaScript code associated with the web page rendered by the browser application 110 to the browser application 110, the browser emulator 126 may be configured to parse HTML content into a full browser DOM, and then load and execute the associated JavaScript in its JavaScript engine.

The browser emulator 126 is configured to include a script engine and an associated threading model that emulates behavior of a browser application. The browser emulator 126, in one embodiment, supports complete browser DOM and may be configured to simulate behavior of vendor-specific browsers. The browser emulator 126 is also configured to provide binding and synchronization utilizing the specialized communications channel 102. For the purposes of this specification, the term binding refers to a technique where any user interaction with respect to a browser application is recognized by a browser application that communicates with the browser application via a specialized communications channel. User interaction with a browser application could trigger both generating of native browser/DOM events and/or DOM changes, such as, key typing in text field, mouse movement and click, window resizing, etc. The term synchronization refers to a technique where any changes to the DOM associated with the web page rendered by a browser application that result from a browser emulator executing JavaScript code user are propagated to the browser application via a specialized communications channel 102. The browser emulator 126, in one example embodiment, may also be configured to include capture and replay capability (a capture and replay module) that permits capturing events at a browser application and replaying the captured events at the browser emulator 126. In one embodiment, the a capture and replay module may be configured to capture all active user interactions with the associated browser application, as well as all Ajax request/response events, and also enable simulating user interactions using programmatic replay based on captured data. This capability may be used for auto-generation of JUnit tests with window events, user interactions, and AJAX operations. The browser emulator 126, in one example embodiment, may also include an event handling module to support browser-specific event propagation model (such as capture and bubbling phase), a script execution module to support browser-specific threading model, a browser binding module to allow the browser emulator 126 to retrieve graphic rendering properties from a browser, a DOM synchronization module to enable auto-synchronization of DOM representations in the browser emulator 126 and the associated browser application. The browser emulator 126, in one example embodiment, may also include a browser communications module (that corresponds to a communications module 116 on the client side) that supports synchronous and asynchronous messaging as well as HTTP via socket communication. It will be noted, that a browser emulator 126 may be used in a Java application running inside a browser application via a plug-in architecture. With the synchronization between a browser emulator and the hosting browser application, the Java application can access and manipulate browser DOM via a pure Java API.

Figure 2:
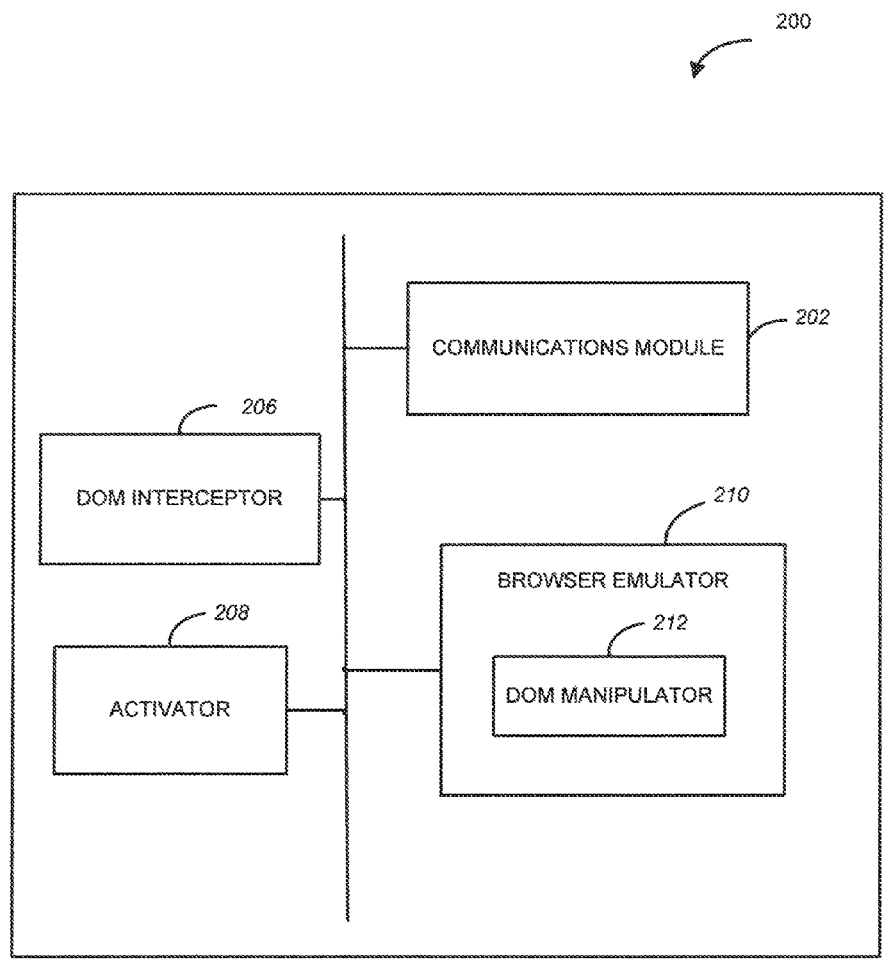
FIG. 2 is block diagram of a browser emulator system, in accordance with one example embodiment.

A plurality of modules that are used in conjunction with the server system 120, including the browser emulator 126, may be referred to as a browser emulator system. An example browser emulator system is described with reference to FIG. 2. FIG. 2 is block diagram of a browser emulator system 200, in accordance with one example embodiment. Various modules shown in FIG. 2 may reside on a server computer system and may be operating within an integrated development environment (IDE).

As shown in FIG. 2, the system 200 includes a communications module 202, a document object model (DOM) interceptor 206, an activator 208, and a DOM manipulator 212 included in a browser emulator 210. The communications module 202, in one example embodiment, corresponds to the web server 122 of FIG. 1. The communications module 202 is configured to receive requests for web pages from a browser application via a transport protocol link such as, e.g., HTTP. The document object model (DOM) interceptor 206 is configured to intercept an initial document object model (DOM) provided by the web application 124 of FIG. 1 in response to a request for a web page from a browser application. The activator 208 is configured to activate the browser emulator 210. As mentioned above, the browser emulator 210 is a Java runtime configured to execute JavaScript instructions. When the browser emulator 210 is activated by the activator 208, the browser emulator 210 accesses the DOM obtained by the communications module 202 from a web application and engages the DOM manipulator 212 to generate a modified DOM. A marked-up document (e.g., an HTML document) that corresponds to the modified DOM includes an event interceptor that replaces JavaScript code associated with the original DOM provided by the web application. In one embodiment, an event interceptor configured to run in a browser application (e.g., provided on a client computer system) may be implemented as a Flash® component and may be utilized to facilitate communications via the specialized communications channel 102 between a browser application that renders the web page and the browser emulator 126. Example operations performed by a browser emulator system are discussed with reference to FIG. 3.

Figure 3:
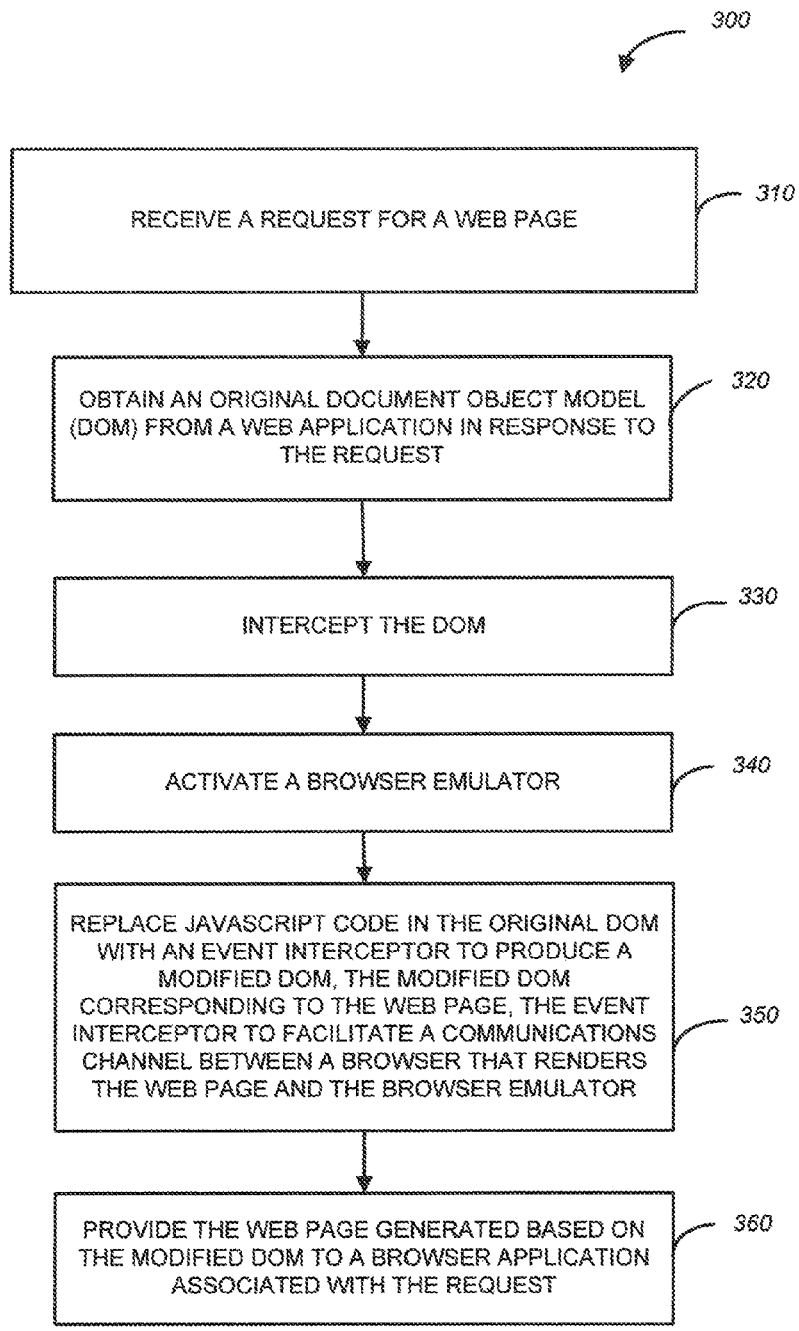
FIG. 3 is a flow chart of a method for using a browser emulator, in accordance with an example embodiment.

FIG. 3 is a flow chart of a method for using a browser emulator, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at a computer system hosting the server system 120 for providing a web page of FIG. 1 and, specifically, at the server system 200 shown in FIG. 2.

As shown in FIG. 3, the method 300 commences at operation 310, when the communications module 202 of FIG. 2 receives a request for a web page from a browser application. At operation 320, the communications module 202 obtains a DOM associated with the requested web page. The DOM obtained by the communications module 202 from a web application may be referred to as an original DOM. At operation 330, the DOM interceptor of FIG. 2 intercepts the original DOM. The activator 208 of FIG. 2 activates the browser emulator 210 of FIG. 2 at operation 340. At operation 350, the DOM manipulator that may be provided with the browser emulator 210 replaces JavaScript code in the original DOM with an event interceptor to produce generating a modified DOM corresponding to the requested web page. The event interceptor is configured to facilitate communications over a specialized communications channel between a browser that renders the web page and the browser emulator 210. The requested web page is generated based on the modified DOM and provided to the browser application at operation 360. Example operations performed in the process of client-side activation are described with reference to FIG. 4.

Figure 4:
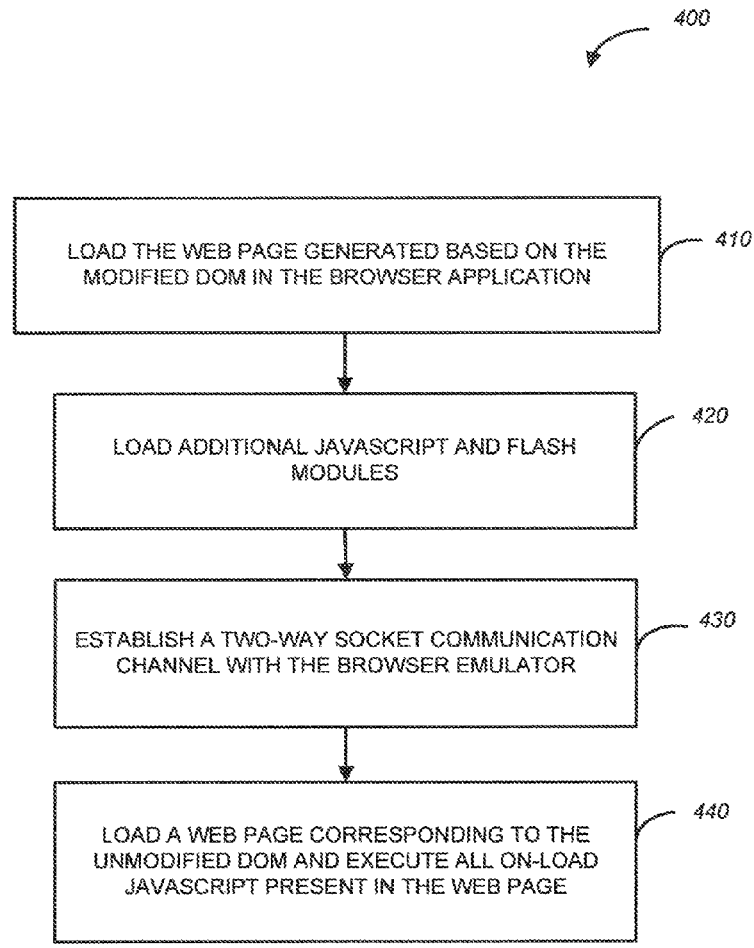
FIG. 4 is a flow chart illustrating a method for loading a web page associated with the modified DOM, in accordance with an example embodiment.

FIG. 4 is a flow chart illustrating a method 400 for processing a web page associated with the modified DOM, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides in various modules illustrated in FIG. 1 and FIG. 2.

As shown in FIG. 4, at operation 410, the browser application 110 of FIG. 1 loads a web page associated with the modified DOM. At operation 420, the browser application 110 loads additional JavaScript and Flash modules provided by an embedded web server associated with the browser emulator 126. At operation 430, the activation module 114 of FIG. 1 establishes a two-way socket communication channel with the browser emulator 126. The two-way socket communication channel is illustrated in FIG. 1 as the specialized communications channel 102. At operation 440, the browser emulator 126 loads a web page corresponding to the unmodified DOM provided by the web application 124 and executes all on-load JavaScript present in the web page.

Figure 5:
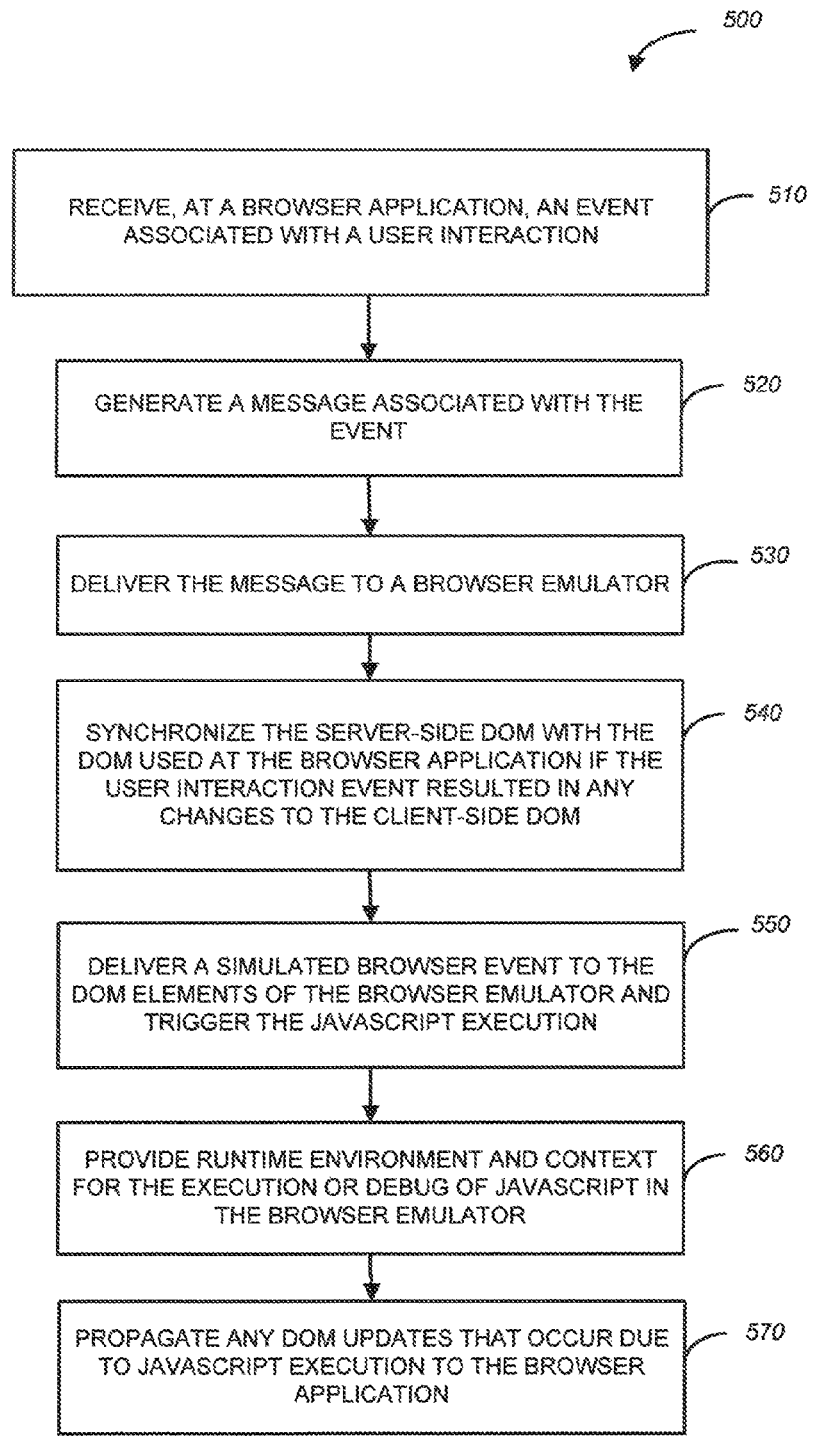
FIG. 5 is a flow chart illustrating a method for processing user interaction directed to a browser application that is in communication with a virtual browser, in accordance with an example embodiment.

FIG. 5 is a flow chart illustrating a method 500 for processing user interaction directed to a browser application that is in communication with a virtual browser, in accordance with one embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides in various modules illustrated in FIG. 1 and FIG. 2.

As shown in FIG. 5, at operation 510, the browser application 110 of FIG. 1 receives an event associated with a user interaction (e.g., a mouse or a keyboard event). The event interceptor 112 of FIG. 1 generates a message in response to the user interaction at operation 520. At operation 530, the browser communications module 116 of FIG. 1 delivers the message to the browser emulator 126 of FIG. 1. The server-side DOM is synchronized with the DOM used at the browser application 110 if the user interaction event resulted in any changes to the client-side DOM, at operation 540. At operation 550, an event handling module provided at the server system 120 of FIG. 1 delivers a simulated browser event to the DOM elements of the browser emulator 126, based on the associated propagation model, and triggers the JavaScript execution if there are registered event listeners or event handlers. At operation 560, the script execution module provided with the browser emulator 126 provides runtime environment and context for the execution or debug of JavaScript in the browser emulator 126. In some situations, accessing a DOM property from JavaScript may require the browser binding module provided with the browser emulator 126 to retrieve value from the browser application 110. At operation 570, any DOM updates that occur due to JavaScript execution are propagated to the browser application 110 via the DOM synchronization module provided with the browser emulator 126.

Figure 6:
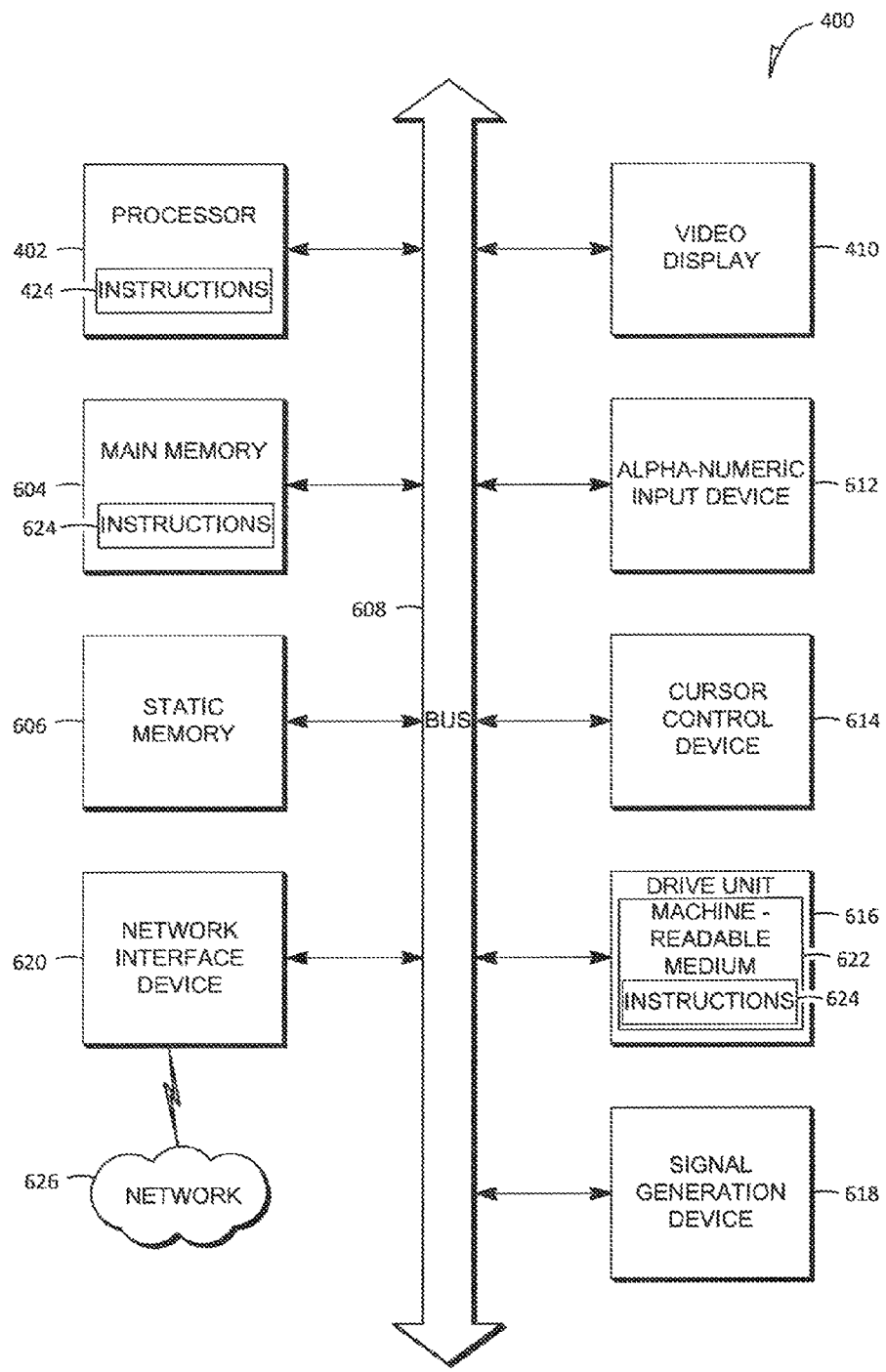
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a browser emulator system has been described. Although a browser emulator system has been described with reference to specific example embodiments, it will be evident that various modifications and changes may be made to these embodiments without departing from the broader spirit and scope of the inventive subject matter. Although various exemplary embodiments discussed herein focus on implementation on Java®-based servers and related environments, the embodiments are given merely for clarity in disclosure. Thus, any type of server environment, based on an architecture-neutral-language, including various system architectures, may employ various embodiments described herein. Accordingly, the specification and drawings are to be regarded in an illustrative rather than a restrictive sense.

What is claimed is:

1. A computer-implemented system comprising:
a communications module to receive, using at least one processor, a request for a web page;
a document object model (DOM) interceptor to intercept, using at least one processor, an original document object model (DOM) provided by a web application in response to the request;
an activator to activate, using at least one processor, a browser emulator, the browser emulator being a Java runtime configured to execute JavaScript code;
a DOM manipulator to extract JavaScript code from the original DOM and to replace, using at least one processor, JavaScript code in the original DOM with an event interceptor to produce a modified DOM, the modified DOM corresponding to the requested web page, the event interceptor to facilitate communications over a specialized communications channel between a browser application that renders the web page and the browser emulator; and
the browser emulator to:
receive a request issued by the event interceptor loaded in the browser application, and
commence executing the JavaScript code extracted from the original DOM.

2. The system of claim 1, wherein the communications module is to:
generate the requested web page corresponding to the modified DOM; and
provide the web page to the browser application.

3. The system of claim 1, wherein the browser emulator is to:
receive an event from the browser application that renders the web page via the specialized communications channel;
execute JavaScript code associated with the event; and
propagate a result of the execution of the JavaScript code associated with the event to the browser application.

4. The system of claim 3, wherein the browser emulator is to update the modified DOM in response to the execution of the JavaScript code associated with the event.

5. The system of claim 3, wherein the event is associated with a user action.

6. The system of claim 5, wherein the result of the execution of the JavaScript code associated with the event is associated with a visual presentation of the web page.

7. The system of claim 1, wherein the browser emulator is in communication with a debugging module, the browser emulator to provide data associated with execution of the JavaScript code to the debugging module.

8. The system of claim 1, wherein the browser emulator is provided as part of an integrated development environment.

9. The system of claim 1, wherein the browser emulator and the browser application that renders the web page are provided on the same hardware.

10. The system of claim 1, wherein the event interceptor is provided according to a type of the browser application that renders the web page.

11. A computer-implemented method comprising:
using one or more processors to perform at least some of operations of:
receiving a request for a web page;
intercepting an original document object model (DOM) provided by a web application in response to the request;
activating a browser emulator, the browser emulator being a Javaruntime configured to execute JavaScript code;
extracting JavaScript code from the original DOM;
replacing JavaScript code in the original DOM with an event interceptor to produce a modified DOM, the modified DOM corresponding to the requested web page, the event interceptor to facilitate communications over a specialized communications channel between a browser application that renders the web page and the browser emulator;
loading the event interceptor in the browser application;
receiving a request issued by the event interceptor loaded in the browser application; and commencing executing the JavaScript code extracted from the original DOM.

12. The method of claim 11, comprising:
generating the requested web page corresponding to the modified DOM; and
providing the web page to the browser application.

13. The method of claim 11, comprising:
receiving an event from the browser application that renders the web page via the specialized communications channel;
executing JavaScript code associated with the event; and
propagating a result of the execution of the JavaScript code associated with the event to the browser application.

14. The method of claim 13, comprising updating the modified DOM in response to the executing of the JavaScript code associated with the event.

15. The method of claim 13, wherein the event is associated with a user action.

16. The method of claim 15, wherein the result of the executing of the JavaScript code associated with the event is associated with a visual presentation of the web page.

17. The method of claim 13, comprising providing data associated with the executing of the JavaScript code to a debugging module.

18. The method of claim 13, wherein the executing of the JavaScript code is performed in an integrated development environment.

19. The method of claim 11, comprising:
determining a vendor-specific type of the browser application; and
replacing the JavaScript code in the original DOM with the event interceptor based on the vendor-specific type of the browser application.

20. A machine-readable non-transitory storage medium having instruction data to cause a machine to perform operations comprising:
receive a request for a web page;
intercept an original document object model (DOM) provided by a web application in response to the request;
activate a browser emulator, the browser emulator being a Java runtime configured to execute JavaScript code;
extract JavaScript code from the original DOM;
replace JavaScript code in the original DOM with an event interceptor to produce a modified DOM, the modified DOM corresponding to the requested web page, the event interceptor to facilitate communications over a specialized communications channel between a browser application that readers the we page and the browser emulator;
load the event interceptor in the browser application;
receive a request issued by the event interceptor loaded in the browser application; and commence executing the JavaScript code extracted from the original DOM.

* * * * *

UNITED STATES PATENT AND TRADEMARK OFFICE
CERTIFICATE OF CORRECTION

| | | |
|---|---|---|
| PATENT NO. | : 8,924,943 B2 | Page 1 of 1 |
| APPLICATION NO. | : 12/505411 | |
| DATED | : December 30, 2014 | |
| INVENTOR(S) | : Wang et al. | |

It is certified that error appears in the above-identified patent and that said Letters Patent is hereby corrected as shown below:

Claims

In column 9, line 23, in Claim 11, delete "Javaruntime" and insert --Java runtime--, therefor In column 9, line 34, in Claim 11, after "and", insert --¶--, therefor In column 10, line 37, in Claim 20, delete "readers the we" and insert --renders the web--, therefor In column 10, line 41, in Claim 20, after "and", insert --¶--, therefor Signed and Sealed this
Twenty-seventh Day of October, 2015

Michelle K. Lee
*Director of the United States Patent and Trademark Office*